United States Patent
Keskin et al.

(10) Patent No.: US 11,541,337 B2
(45) Date of Patent: Jan. 3, 2023

(54) WATER FILTRATION DEVICE FOR AIRCRAFT GALLEY PLUMBING SYSTEM

(71) Applicant: B/E Aerospace, Inc., Winston-Salem, NC (US)

(72) Inventors: Volkan Keskin, London (GB); Peter J. L. Burd, Carmarthenshire (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/459,875

(22) Filed: Aug. 27, 2021

(65) Prior Publication Data
US 2021/0387118 A1 Dec. 16, 2021

Related U.S. Application Data

(62) Division of application No. 16/415,539, filed on May 17, 2019, now Pat. No. 11,103,816.

(51) Int. Cl.
*B01D 35/30* (2006.01)
*B01D 35/153* (2006.01)
(Continued)

(52) U.S. Cl.
CPC ......... *B01D 35/30* (2013.01); *B01D 35/1475* (2013.01); *B01D 35/153* (2013.01);
(Continued)

(58) Field of Classification Search
CPC .. B01D 35/30; B01D 35/1475; B01D 35/153; B01D 63/14; B01D 2101/02;
(Continued)

(56) References Cited

U.S. PATENT DOCUMENTS 6,024,229 A    2/2000  Ayers
6,715,615 B1   4/2004  Williams
(Continued)

FOREIGN PATENT DOCUMENTS

CA    2807299 C    2/2019

OTHER PUBLICATIONS

International Search Report and Written Opinion dated Nov. 29, 2019 for PCT/US2019/053853.

*Primary Examiner* — Madeline Gonzalez
(74) *Attorney, Agent, or Firm* — Suiter Swantz pc llo

(57) ABSTRACT

A potable water filter for an aircraft galley plumbing system is disclosed. In embodiments, the filter includes a body attachable to a mount via a central threaded attachment stud. The stud is surrounded by a filter mount chamber and encloses a central flow channel allowing outflow from the filter body to an outlet port. Potable water enters the mount through an inlet port; an annular "puck" inlet valve extends around the attachment stud, sealing off the filter mount chamber when the filter body is absent and, when the filter body is screwed onto the attachment stud, providing for water flow throughout the filter mount chamber. The filter body houses a solid block of sintered carbon with a hollow core. Water enters the filter chamber via bypass slots in the base of the filter body and flows around and through the carbon filter before flowing down to the outlet port.

15 Claims, 13 Drawing Sheets

(51) Int. Cl.
*B01D 63/14* (2006.01)
*B01D 35/147* (2006.01)
*C02F 1/28* (2006.01)
*C02F 1/44* (2006.01)

(52) U.S. Cl.
CPC .............. *B01D 63/14* (2013.01); *C02F 1/283* (2013.01); *C02F 1/44* (2013.01); *B01D 2101/02* (2013.01); *B01D 2201/167* (2013.01); *B01D 2201/4092* (2013.01); *B01D 2201/56* (2013.01); *B01D 2313/18* (2013.01); *B01D 2313/44* (2013.01); *C02F 2201/001* (2013.01); *C02F 2201/005* (2013.01); *C02F 2201/006* (2013.01)

(58) Field of Classification Search
CPC ...... B01D 2201/167; B01D 2201/4092; B01D 2201/56; B01D 2313/18; B01D 2313/44; B01D 2201/302; B01D 35/306; B01D 2313/23; B01D 63/067; B01D 61/18; C02F 1/283; C02F 1/44; C02F 2201/001; C02F 2201/005; C02F 2201/006; C02F 1/444; C02F 2201/004
USPC ......... 210/91, 235, 136, 472, 440–444, 133, 210/120, 234, 117, 436, 97, 130; 137/544, 197, 614.02, 614.03, 587
See application file for complete search history.

(56) References Cited

U.S. PATENT DOCUMENTS

| | | |
|---|---|---|
| 7,249,524 B2 | 7/2007 | Williams et al. |
| 8,671,980 B2 | 3/2014 | Williams et al. |
| 8,877,056 B2 | 11/2014 | Williams et al. |
| 9,109,721 B1 | 8/2015 | Williams et al. |
| 9,216,368 B1 | 12/2015 | Williams et al. |
| 9,546,472 B2 | 1/2017 | Burd |
| 9,675,917 B2 | 6/2017 | Williams et al. |
| 9,795,905 B2 | 10/2017 | Williams et al. |
| 9,845,259 B2 | 12/2017 | Williams et al. |
| 10,005,013 B1 | 6/2018 | Williams et al. |
| 10,011,355 B1 | 7/2018 | Williams et al. |
| 2009/0230047 A1 | 9/2009 | Treyz |
| 2010/0170857 A1* | 7/2010 | Williams ............ B01D 35/147 210/120 |
| 2014/0061112 A1 | 3/2014 | Burd |
| 2018/0099878 A1 | 4/2018 | Levy |
| 2018/0334402 A1 | 11/2018 | Williams et al. |
| 2020/0360842 A1 | 11/2020 | Keskin |

* cited by examiner

WATER FILTRATION DEVICE FOR AIRCRAFT GALLEY PLUMBING SYSTEM

CROSS-REFERENCE TO RELATED APPLICATIONS

The instant application claims the benefit of priority under 35 U.S.C. § 121 as a divisional application of U.S. patent application Ser. No. 16/415,539 filed May 17, 2019, which application issued Aug. 31, 2021 as U.S. Pat. No. 11,103,816. Said U.S. patent application Ser. No. 16/415,539 is herein incorporated by reference in its entirety.

BACKGROUND

To provide satisfactory inflight catering service on commercial passenger carrying aircraft, an adequate supply of potable water must be available, e.g., for drinking water (or for tea, coffee and other hot beverages) for all passengers and crew; for cooking meals when steam ovens are installed; and for other general cleaning or food preparation activities. To ensure that the potable water carried onboard is acceptable for human consumption, "wet" galleys (galleys fitted with a plumbing system and more specifically with a faucet) are generally provided with a water filter designed to improve the quality of the water by addressing taste and odor issues. As aircraft could be re-supplied in countries or regions where water quality may be less than optimum, a water filter ensures that a reasonable standard is maintained.

To achieve effective filtration, it is common practice to pass the water through a carbon filter medium that effectively absorbs a high proportion of the organic matter suspended in the water; this matter can carry bacteria capable of causing taste and odor issues. There are also a number of mechanical certification requirements (e.g., relative to the location of the filters within the galley) that also must be met. For example, the filters must vent and self-seal when the water supply to the galley is turned on prior to flight operations, and self-vent when the supply is turned off (e.g., when flight operations are complete); this allows any residual water in the galley's plumbing system to drain into potable or waste water tanks.

The filter must also be capable of quick and easy replacement (typically in <15 minutes), and should ideally have good flow characteristics with minimal back pressure, so that the cumulative resistance imposed on the aircraft plumbing system by a duplicity of filters does not restrict the water supply to any of the galleys on the aircraft plumbing loop.

When the aircraft or galley plumbing system needs disinfecting the filter is not installed, but for water to circulate freely throughout the system any self-sealing valves must be opened. To achieve this, some sort of automatic or mechanical by-pass must be incorporated.

SUMMARY

A potable water filtration device for an aircraft galley plumbing system is disclosed. In embodiments, the water filtration device includes a filter body attachable to a filter mount via a male threaded attachment stud central to the filter mount. The attachment stud is surrounded by a filter mount chamber and encloses a central flow channel providing for outflow of filtered water from the hollow core of the filter body to an outlet port in the filter mount. Potable water enters the filter mount through an inlet port. An annular inlet or "puck" valve extends around the attachment stud, sealing off the filter mount chamber when the filter body is absent and, when the filter body is screwed onto the attachment stud, providing for water flow from the inlet port throughout the filter mount chamber and toward the filter body chamber. The base of the filter body includes a series of bypass slots around the attachment stud, providing for uniform water flow from the filter mount chamber up into the filter body. The water outlet port includes a one-way check valve to prevent backflow into the filter body. The filter body encloses a filter chamber housing a block of sintered carbon with a hollow core. Water enters the filter chamber and flows around the sintered carbon filter before passing through into the core and flowing down to the outlet port. The filter body includes a self-venting air valve assembly at its top.

In some embodiments, the filter mount includes a transfer passage connecting the central flow channel to the outlet port, and a base O-ring seal at the base of the threaded attachment stud for sealing off the filter mount chamber from the filter body in order to provide a water flow from the inlet port through the filter mount chamber to the outlet port via the transfer passage.

In some embodiments, the potable water filtration device includes a seal block defining the outer wall of the filter mount chamber and a spring for holding the annular inlet valve against the seal block when the filter body is unattached to the filter mount.

In some embodiments, the filtering medium includes sintered carbon.

In some embodiments, the potable water filtration device includes a radio frequency identification (RFID) sensor attached to the inlet port for sensing fluid pressure within the filter chamber.

In some embodiments, the filter housing includes an upper and lower filter housing connected by a joint.

In some embodiments, the joint is either spin welded, ultrasonic welded, solvent bonded or mechanically fastened.

In some embodiments, the filter mount includes two opposing attachment lobes disposed between the inlet port and the outlet port and fastenable to a mounting bracket, the mounting bracket mountable to a wall or other vertical surface.

In some embodiments, the self-venting valve assembly includes a pressure-resistant cap for securing the self-venting valve assembly to the filter housing a movable poppet valve for controlling airflow to or from the filter chamber depending on the water level or fluid pressure within the filter chamber.

In some embodiments, the potable water filtration device includes an outer reinforcing sleeve attached to the filter housing and including a top hole corresponding to the self-venting valve assembly.

In some embodiments, the filter housing includes an extruded double-wall filter case comprising an outer wall and an inner wall separated by a cavity.

In some embodiments, the potable water filtration device includes an outer filter membrane surrounding the filtering medium and configured to protect the filtering medium from particles in the inlet flow channel.

In some embodiments, the outer filter membrane includes a pleated filter.

In some embodiments, the potable water filtration device includes an inner filter membrane within the hollow core, the inner filter membrane configured to protect the central flow channel from detached particles of the filtering medium.

In some embodiments, the inner filter membrane includes a pleated filter.

In some embodiments, the filter body includes a filter base adjacent to the filter mount chamber, the filter base including bypass slots arranged around the threaded mounting stud and configured to admit water flow from the filter mount chamber into the inlet flow channel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
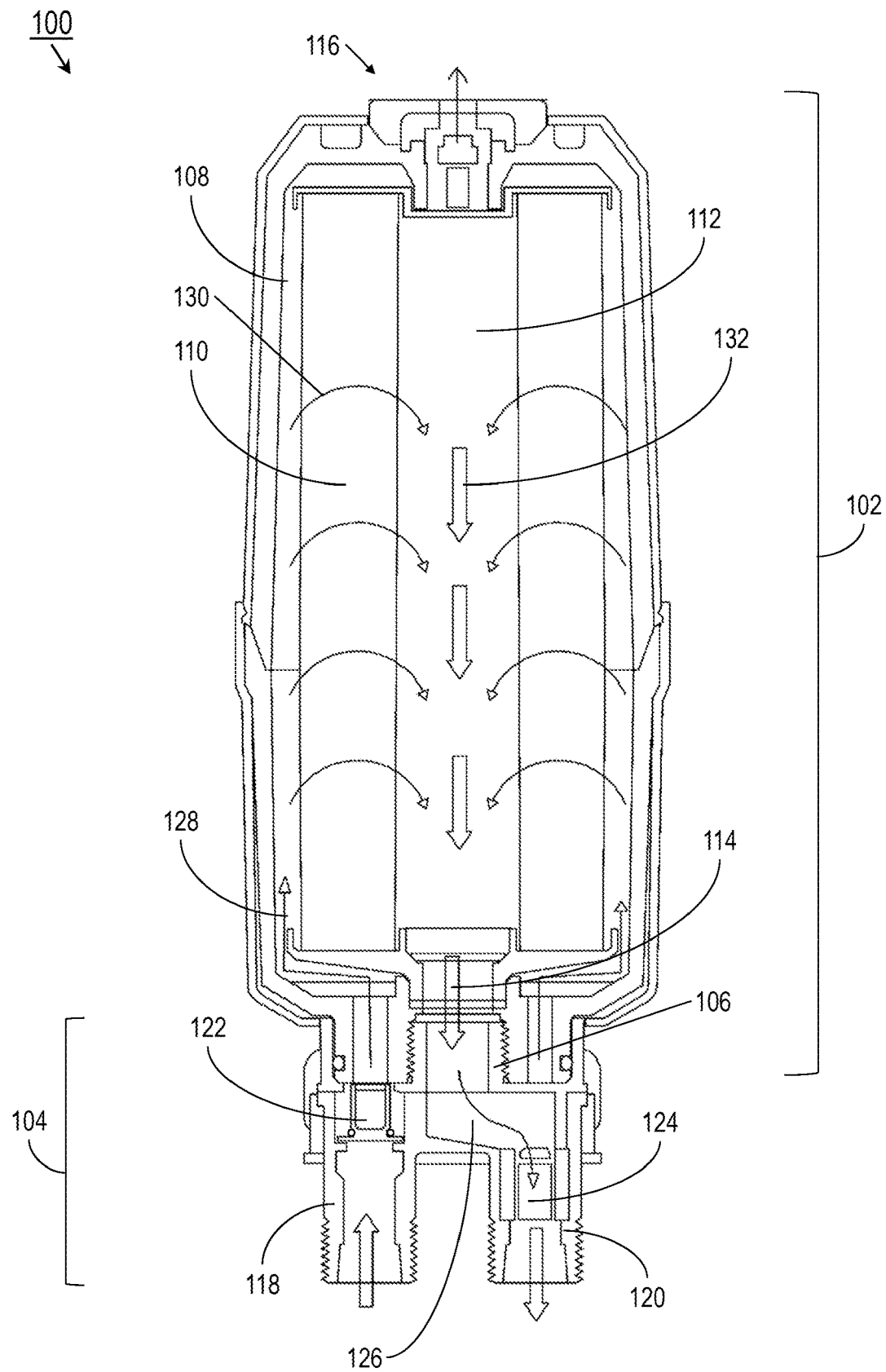
FIG. 1 is a cross-sectional view illustrating a water filtration device in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Referring to FIG. 1, a water filtration device 100 for an aircraft galley plumbing system is disclosed. The water filtration device 100 may include a filter body 102 attached to a filter mount 104 via a threaded attachment stud 106.

In embodiments, the filter body 102 may include a filter chamber 108, a filtering medium 110 having a hollow core 112, a central flow channel 114 enclosed by the threaded attachment stud 106, and a self-venting valve assembly 116. In embodiments, the filter mount 104 may include an inlet port 118, an outlet port 120, a substantially hollow barrel valve 122, a unidirectional check valve 124, and a transfer passage 126.

The filter body 102 (e.g., filter cartridge) may be attached to the filter mount 104 by screwing the filter body onto the male threaded attachment stud 106. The attachment of the filter body 102 may push the barrel valve 122 downward within the inlet port 118 (e.g., compressing the seating spring holding up the barrel valve) and opening the barrel valve, allowing potable water to enter through the inlet port 118 into the filter chamber 108. For example, potable water entering the filter chamber 108 may follow an inlet flow channel 128 around the filtering medium 110.

In embodiments, the filtering medium 110 is a substantially solid sintered carbon core, or any appropriately solid and porous filtering material having a hollow core 112. Potable water filtered (130) by the filtering medium 110 may pass through the filtering medium and into an outlet flow channel 132 through the hollow core 112, into and through the central flow channel 114, and finally through the transfer passage 126 to the outlet port 120, where the filtered potable water leaves the water filtration device 100 (e.g., continuing to travel through the galley plumbing system or toward a terminal faucet where the filtered water may be dispensed). The outlet port 120 may include a unidirectional check valve 124 to prevent contamination due to reversed water flow (e.g., back surge) through the outlet port 120 and into the water filtration device 100.

Figure 2:
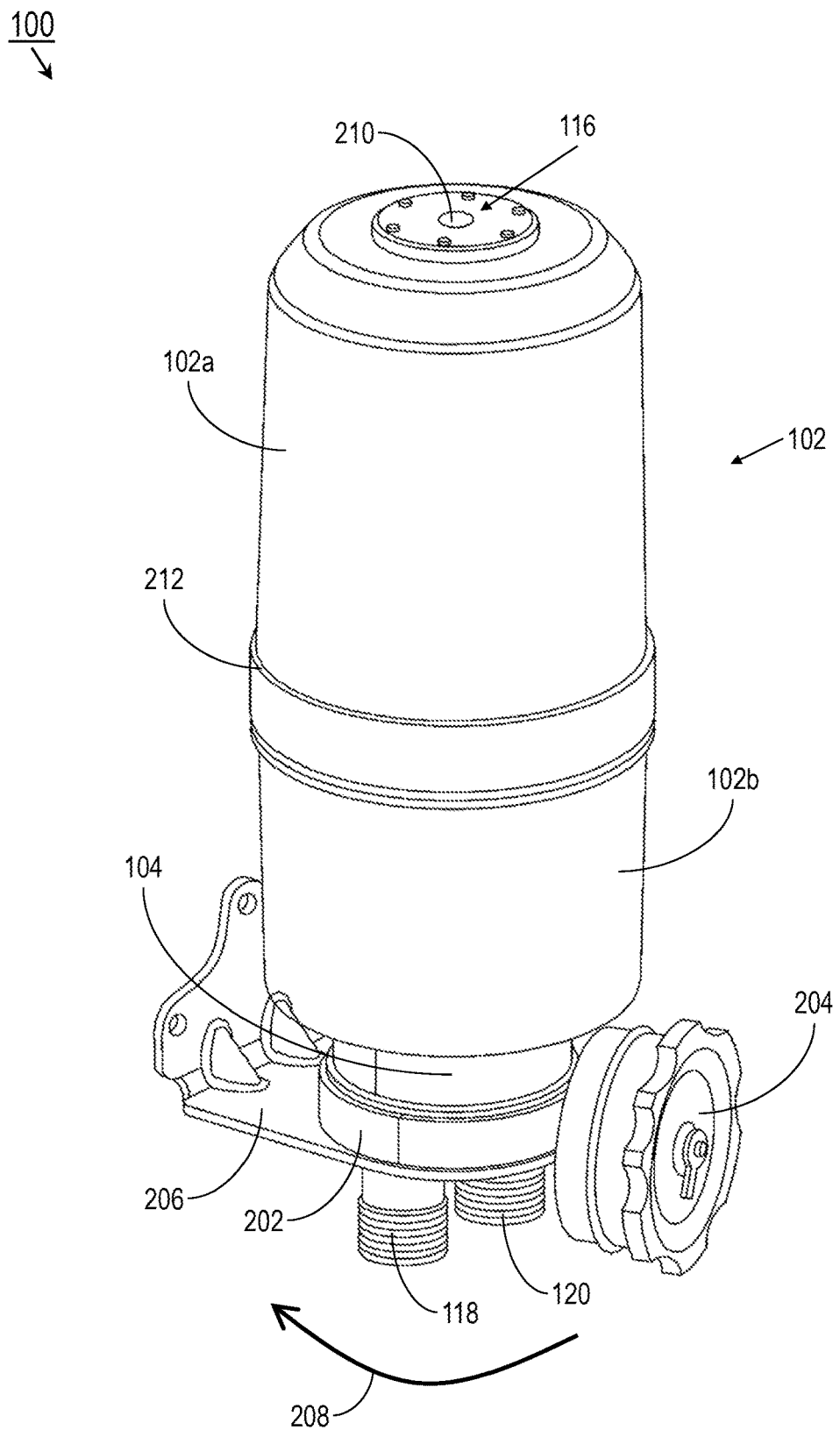
FIG. 2 is an exterior isometric view illustrating the water filtration device of FIG. 1.

Referring to FIG. 2, the water filtration device 100 may include a rotary collar 202, a bypass cap 204 (e.g., blanking cap) mounted thereto, and a mounting bracket 206 via which the water filtration device may be mounted to a wall or other galley surface. The rotary collar 202 may be fitted around the filter mount 104.

Any galley plumbing system must be cleaned periodically, e.g., by flushing the entire system with a disinfectant to eliminate any accumulated bacteria. In advance of a systemwide flushing, the filter body 102 may be removed from the filter mount 104. In embodiments, the bypass cap 204 may be fitted to the threaded attachment stud 106 for opening the barrel valve (122, FIG. 1) when the filter body 102 is absent from the filter mount 104. By opening the barrel valve 122, the filter mount chamber (302, FIG. 3A) may provide a sealed chamber fluidly connecting the inlet port 118 and the outlet port 120 and allowing circulation throughout the galley plumbing system.

In embodiments, the rotary collar 202 may allow the positioning of the bypass cap 204 at multiple stowage positions along the circumference (208) of the rotary collar depending upon spatial or installation demands in the vicinity of the water filtration device 100.

In embodiments, the self-venting valve assembly 116 may be disposed atop the filter body 102 and include one or more venting slots or holes 210. For example, the self-venting valve assembly 116 may prevent the water filtration device 100 from experiencing "air lock", wherein the filter chamber (108, FIG. 1) fails to completely fill with water, impeding the capacity of the water filtration device to serve as a filter. Under normal operational water pressures within the filter chamber 108, the self-venting valve assembly 116 may provide for a full seal of the venting slots 210 when the water level approaches the valve assembly.

When flight operations conclude and the potable water supply is deactivated, the galley plumbing system must be capable of draining all residual water (e.g., from the system proper and from any galley insert (GAIN) devices connected thereto) within a reasonable time (e.g., 5 minutes). In embodiments, the self-venting valve assembly 116 assists in the drainage process by opening the venting slots 210 when the water pressure within the filter chamber 108 drops to a predetermined level (e.g., below the operational pressure level), allowing air to enter the filter chamber through the venting slots and the residual water therewithin to drain (e.g., via the central flow channel 114 and outlet port 120). The self-venting valve assembly 116 may be assisted by springs, gravity, or any other appropriate means of opening or sealing the venting slots 210 as needed or desired.

In embodiments, the filter body 102 may be composed of a high-density shell (e.g., high density plastic or a similar material) in two parts, an upper portion 102a and a lower portion 102b, the two parts jointed or welded together (212) along the height of the filter body. For example, the joint 212 may include a spin-welded joint, an ultrasonic-welded joint, a solvent bond, a mechanically fastened joint, or any other appropriate joint or weld capable of fastening the upper and lower portions 102a, 102b.

Figure 3A:
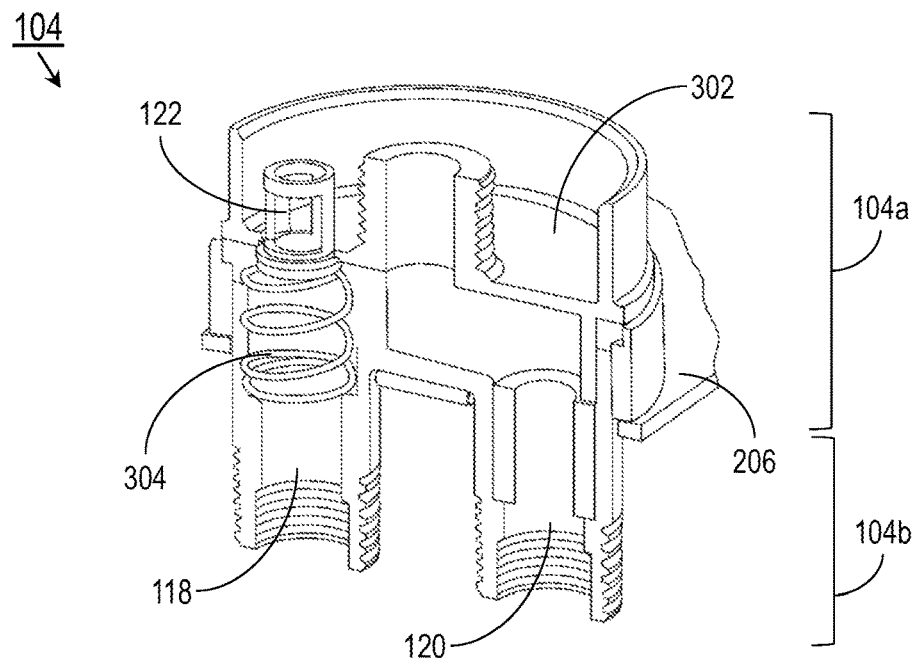
FIG. 3A is a cutaway view illustrating a filter mount of the water filtration device of FIG. 1.
Figure 3B:
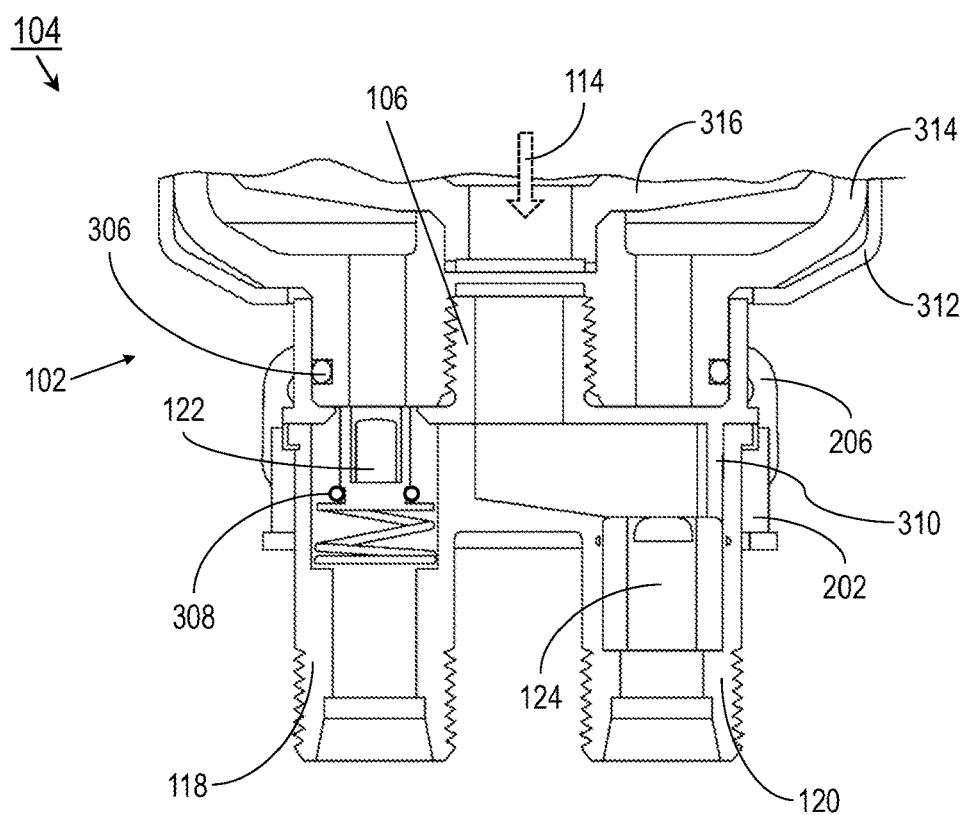
FIG. 3B is a cross sectional view illustrating a filter mount and filter body of the water filtration device of FIG. 1.
Figure 3C:
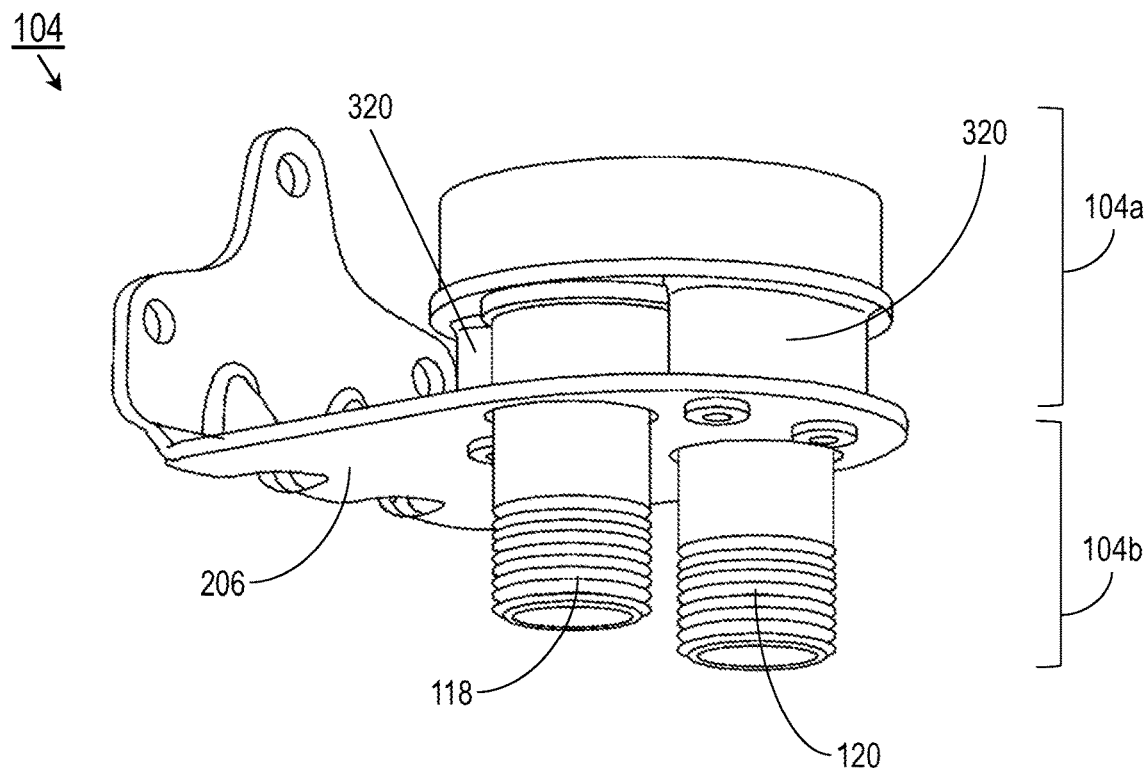
FIG. 3C is an isometric view illustrating a filter mount and mounting bracket of the water filtration device of FIG. 1.

Referring to FIGS. 3A through 3C, the filter body 102 and filter mount 104 are disclosed. The filter mount 104 may have two parts, an upper filter mount 104a (incorporating the filter mount chamber 302 around the threaded attachment stud 106) and a lower filter mount 104b (incorporating the inlet port 118 and the outlet port 120), held together via the mounting bracket 206. The filter mount 104 may additionally include a seating spring 304, a filter body O-ring seal 306, a barrel valve O-ring seal 308, and a check valve retainer 310. The filter body 102 may additionally include an outer filter housing 312 fully or partially enclosing an inner filter housing 314 as well as a filter block support 316 supporting the filtering medium (110, FIG. 1) and partially enclosing the central flow channel 114.

In embodiments, the seating spring 304 and barrel valve O-ring 308 may hold and seal the barrel valve 122 to the seal seat of the upper filter mount 104a, sealing off the inlet port 118 from the filter mount chamber 302 while the filter body 102 is absent from the filter mount 104 (as shown by FIG. 3A; or, e.g., if the barrel valve 122 is not otherwise activated or opened by the bypass cap (204, FIG. 2)) and preventing potable water flow into the filter mount chamber. Similarly, the filter body O-ring 306 may provide a watertight seal between the filter body 102 and the filter mount 104.

In embodiments, the check valve retainer 310 may hold the check valve 124 in place within the outlet port 120 when the upper and lower filter mounts 104a-b are bolted together via the mounting bracket 206, allowing easy replacement of the check valve should the valve develop a fault.

Referring in particular to FIG. 3C, in embodiments the upper filter mount 104a may include two attachment lobes 320 extending downward outside the filter mount chamber 302, each lobe situated between the inlet port 118 and outlet port 120. In embodiments, the filter mount 104 may be secured to the mounting bracket 206 by bolting or otherwise fastening the attachment lobes 320 to the mounting bracket. The attachment lobes 320 may serve as a fixing point location and guide for the rotary collar 202 and bypass cap (204, FIG. 2) attached thereto, e.g., the rotary collar may be positioned around the attachment lobes.

Figure 3D:
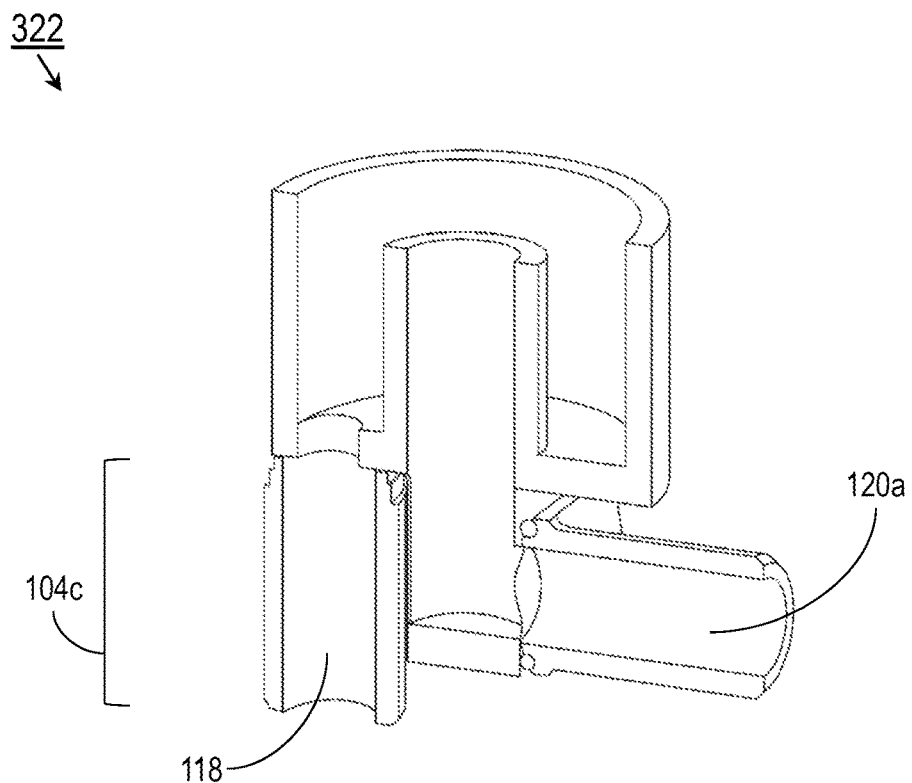
FIG. 3D is a cutaway view illustrating an alternative water outlet of the water filtration device of FIG. 1.

Referring in particular to FIG. 3D, the filter mount 322 may be implemented and may function similarly to the filter mount 104, except that while the upper filter mount 104a may be standardized, the lower filter mount (104b, FIGS. 3A-C) may be equipped with a variety of connectors (e.g., threaded, clamshell, quick-disconnect) as needed or as space considerations demand. For example, the filter mount 322 may include a lower filter mount 104c incorporating an orthogonal outlet port 120a extending at an angle, rather than parallel, to the inlet port 118.

Figure 4:
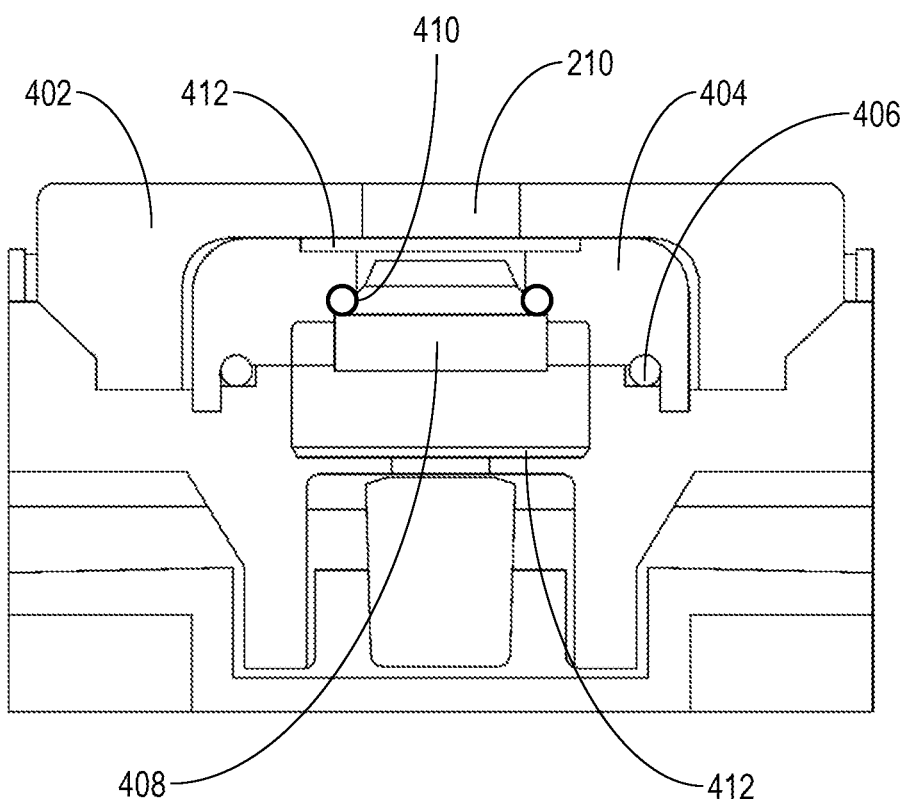
FIG. 4 is a cross-sectional view illustrating a self-venting valve assembly of the water filtration device of FIG. 1.

Referring to FIG. 4, the self-venting valve assembly 116 is disclosed. In embodiments, the self-venting valve assembly 116 may incorporate any appropriate means of venting air to and from the filter chamber (108, FIG. 1) while the fluid pressure within the filter chamber is below operational pressure levels. For example, the self-venting valve assembly 116 may include a poppet seal block 402 and a pressure-resistant cap 404 securing the valve assembly to the filter body (102, FIG. 1) at its top, or opposite the filter mount (104, FIGS. 3A-C) to which the filter body is mounted, the seal block 402 sealed to the filter body by a seal block O-ring 406. The self-venting valve assembly 116 may incorporate a floating or otherwise movable poppet valve 408. When water levels or fluid pressure increase within the filter chamber 108, the poppet valve 408 may rise to seal the venting slot 210 (e.g., via a poppet O-ring 210). The self-venting valve assembly 116 may include FDA-standard anti-insect mesh screens 412 (e.g., stainless steel mesh) above and below the poppet valve 408.

Figure 5A:
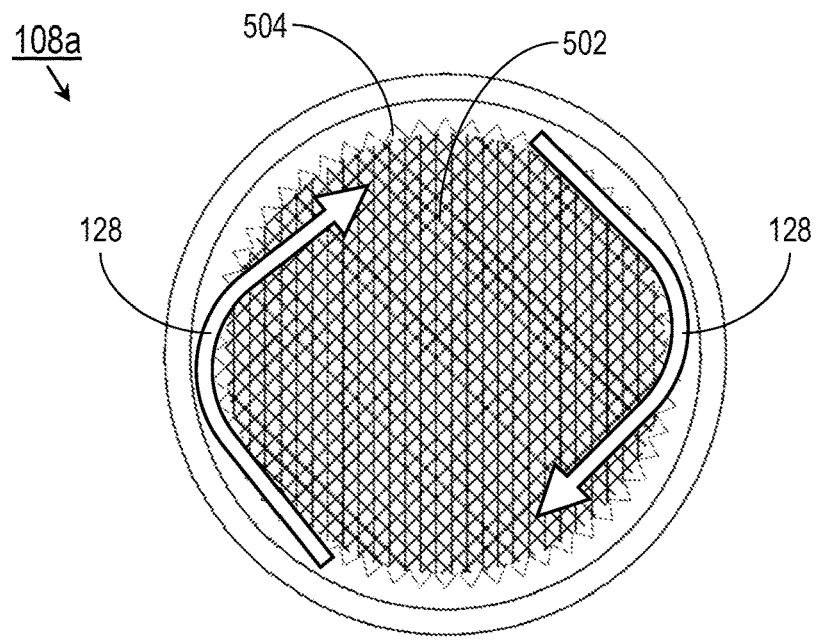
FIGS. 5A and 5B are overhead cross-sectional views respectively illustrating an outer protective sleeve and an inner protective sleeve of the water filtration device of FIG. 1, FIGS. 6A and 6B are partial cross-sectional views illustrating filter housing joints of the water filtration device of FIG. 1.
Figure 5B:
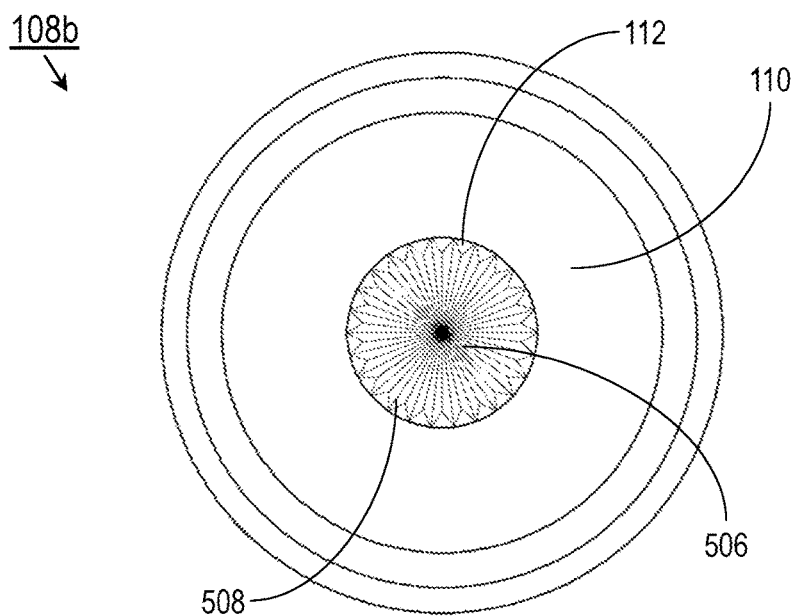

Referring to FIGS. 5A and 5B, the filter chambers 108a and 108b are disclosed. The filter chambers 108a-b may be implemented and may function similarly to the filter chamber 108 of FIG. 1, except that the filter chambers 108a-b may incorporate protective filter membranes to enhance the filtering ability of the filtering medium (110, FIG. 1).

For example, referring in particular to FIG. 5A, the outer surface of the filtering medium 110 may be wrapped in an outer filter membrane 502 to remove larger particles from the inlet flow channel 128 that might otherwise clog the pores of the filtering medium 110. In embodiments, the outer filter membrane 502 may be a plain or pleated (504) woven or non-woven fabric.

Similarly, referring in particular to FIG. 5B, an inner filter membrane 506 may be fashioned and may function similarly to the outer filter membrane 502, except that the inner filter membrane 506 may be installed within the hollow core 112 of the filtering medium 110 to prevent any particles detaching from the filtering medium (e.g., sintered carbon particles) from entering the potable water supply via the outflow channel (132, FIG. 1). Like the outer filter membrane 502, the inner filter membrane 506 may be plain or pleated (508).

Figure 6A:
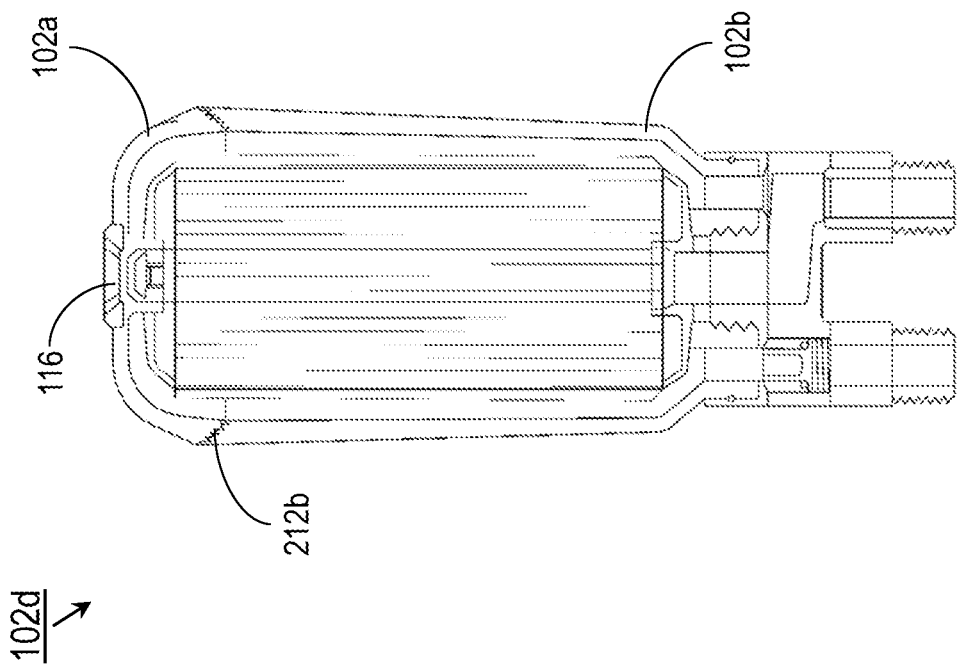
FIG. 6C is a partial cross-sectional view illustrating a reinforcing sleeve of the water filtration device of FIG. 1.
FIG. 6D is an overhead cross-sectional view illustrating a filter housing of the water filtration device of FIG. 1.
Figure 6B:
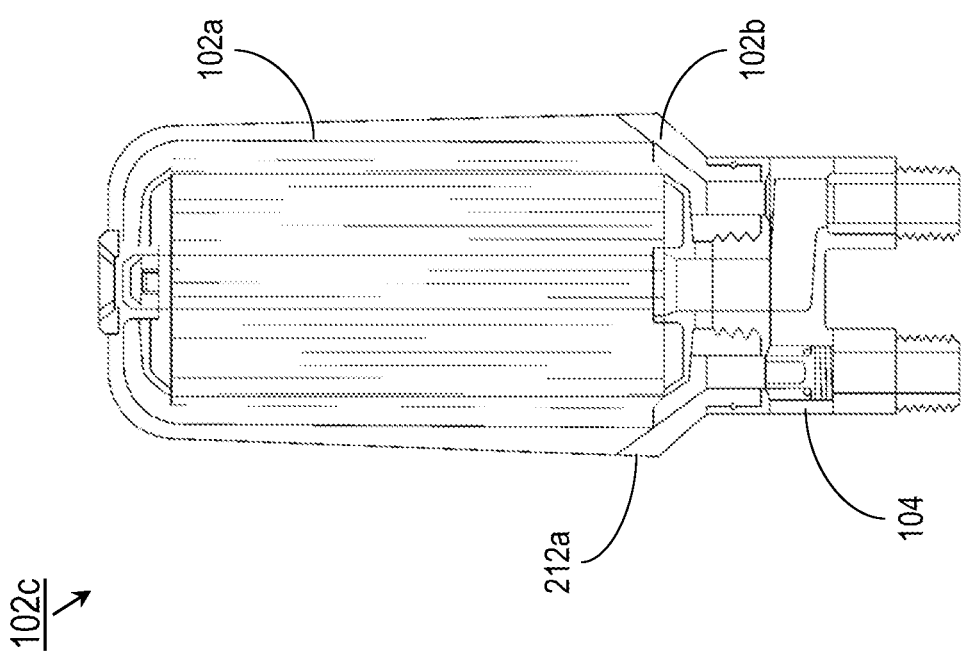

Referring to FIGS. 6A and 6B, the filter bodies 102c, 102d may be implemented and may function similarly to the filter body 102 of FIG. 2, except that (referring in particular to FIG. 6A) the filter body 102c may incorporate a joint 212a between the upper and lower portions 102a, 102b near the bottom of the filter body (e.g., proximate to the filter mount 104). Similarly, referring to FIG. 6B, the filter body 102d may incorporate a joint 212b between the upper and lower portions 102a, 102b near the top of the filter body (e.g., proximate to the self-venting valve assembly 116).

Figure 6D:
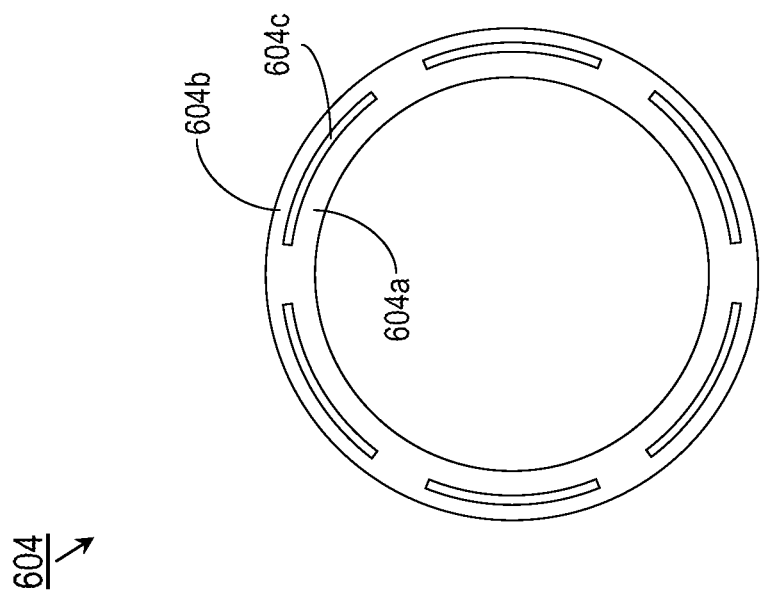
Figure 6C:
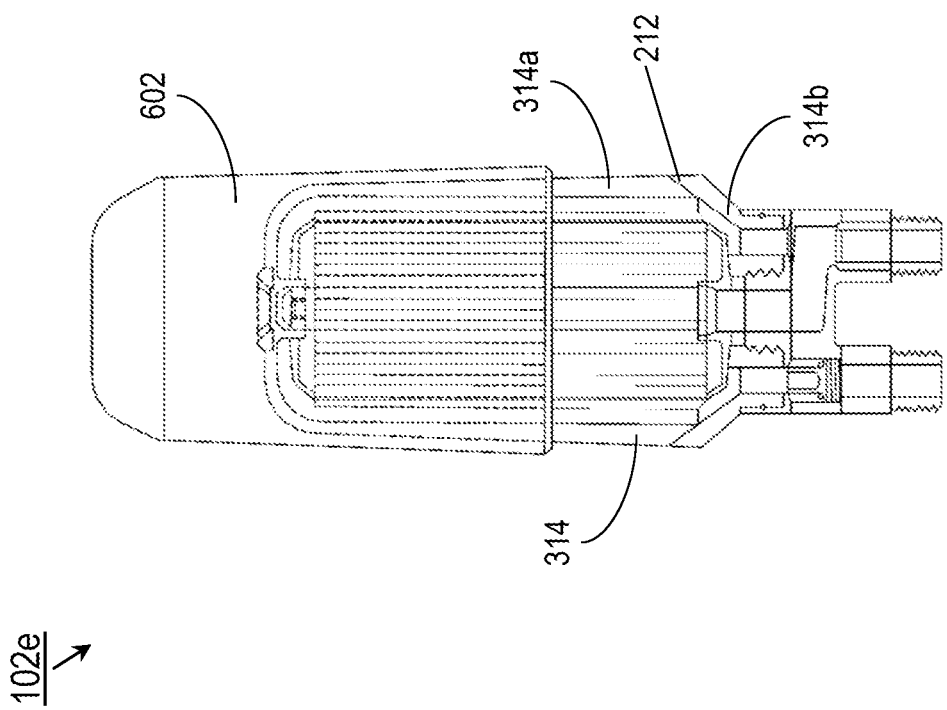

Referring to FIG. 6C, the filter body 102e may be implemented and may function similarly to the filter bodies 102, 102c-d of FIGS. 2 and 6A-B, except that the filter body 102e may be constructed of an inner filter housing 314 (e.g., an injection-molded plastic filter case) with an outer protective shell 602 installed thereon to guard against impact shock or concussive damage to the filter body 102e or its components, e.g., if the filter body 102e is dropped. In some embodiments, the outer protective shell 602 may be fashioned from a thin layer of high impact plastic or thin gauge steel. In the latter case, the outer protective shell 602 may provide additional reinforcement against burst-pressure failure to the joint 212 between the upper and lower portions 314a-b of the inner filter housing 314.

Referring to FIG. 6D, the double-wall outer protective shell 604 may be implemented and may function similarly to the outer protective shell 602 of FIG. 6C, except that the double-wall outer protective shell 604 may be fashioned from an extruded, substantially cylindrical plastic tube comprising an inner wall 604a and an outer wall 604b separated by cavities 604c to protect the filter body (102e, FIG. 6C). In some embodiments, the self-venting valve assembly (116, FIG. 6B) and the female internally threaded fixing point attachable to the male threaded attachment stud (106, FIG. 1) may be attached only to the inner filter housing (314, FIG. 6C) and not to the double-wall outer protective shell 604.

Figure 7A:
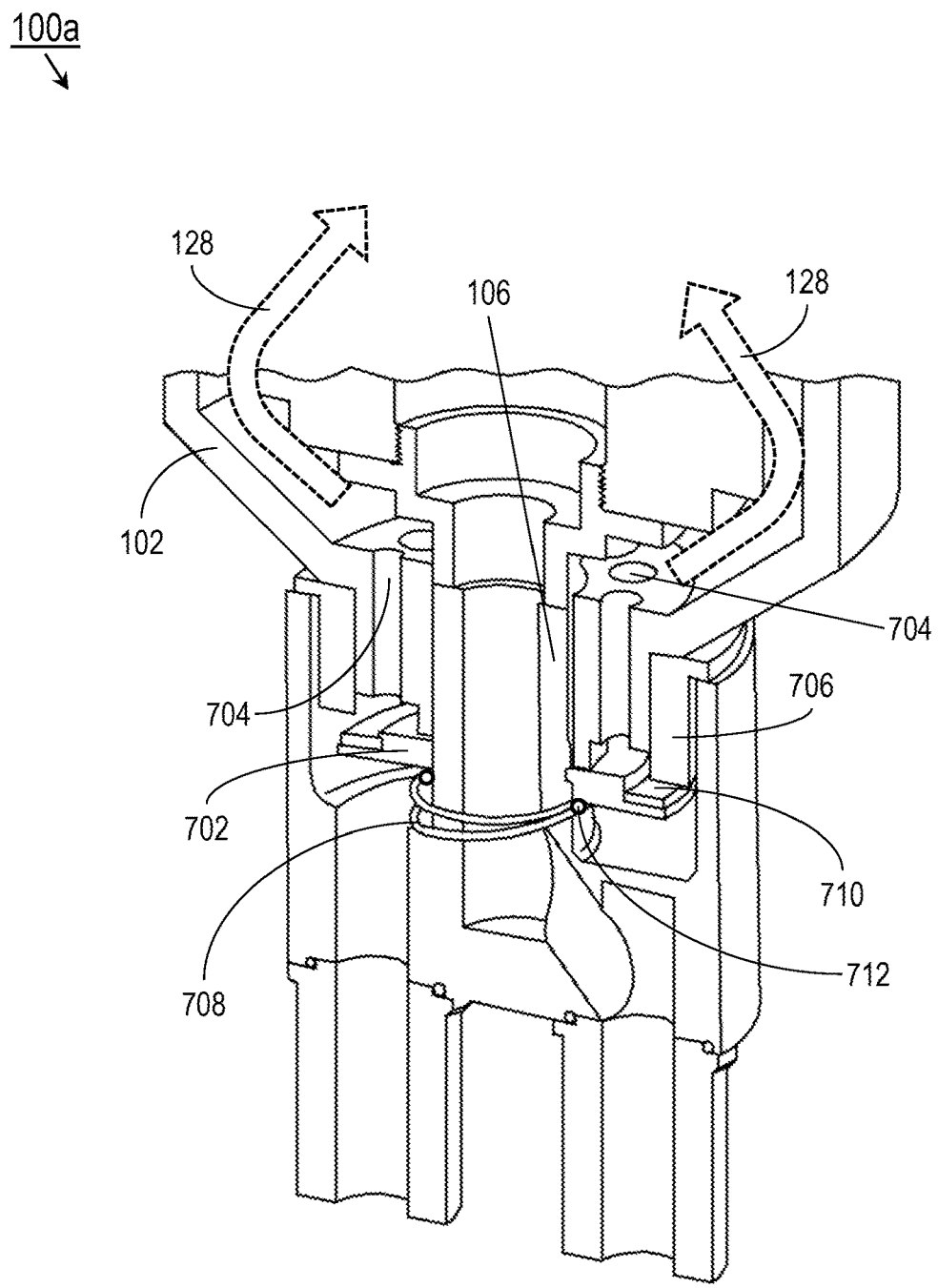
FIG. 7A is an isometric cutaway view illustrating a self-contained sanitizing system of the water filtration device in accordance with example embodiments of this disclosure.
Figure 7B:
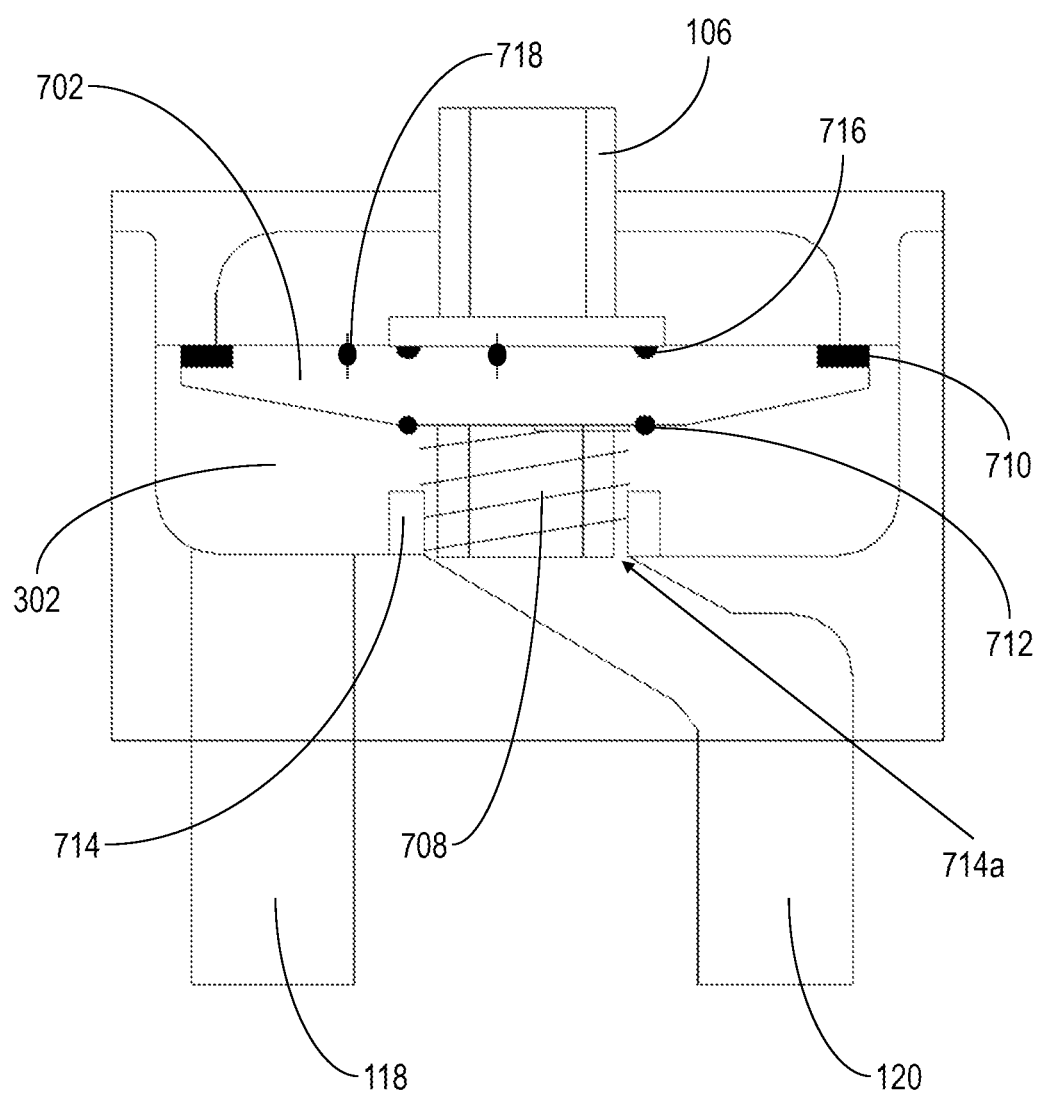
FIG. 7B is a diagrammatic cross-sectional view illustrating a self-contained sanitizing system of the water filtration device of FIG. 7A.

Referring to FIGS. 7A and 7B, the water filtration device 100a may be implemented and may function similarly to the water filtration device 100 of FIG. 1, except that the water filtration device 100a may incorporate (e.g., instead of the barrel valve 122, FIG. 1) a puck valve 702.

In embodiments, the puck valve 702 may be a substantially circular valve allowing for more even potable water flow from the inlet port 118 into the inlet flow channel 128 through a series of bypass slots 704 (e.g., holes) set into the base of the filter body 102. For example, the puck valve 702 may screw onto the threaded attachment stud 106 (e.g., allowing both retrofitting and go-forward installation of the puck valve with respect to the water filtration device 100). When the filter body 102 is absent from the filter mount 104, the puck valve 702 may be pushed upward into the seal block 706 by a spring 708, where the puck peripheral seal 710 and puck O-ring seal 712 provide an airtight and watertight mount between the filter body 102 and filter mount 104.

Referring in particular to FIG. 7B, the filter mount 104d may be implemented and may function similarly to the filter mount 104 of FIG. 7A, except that the filter mount 104d may additionally incorporate a bypass collar 714 and base O-ring seal 716 at the base of the threaded mounting stud 106 to seal off the filter mount chamber 302 and allow the flushing and sanitization of the galley plumbing system (e.g., via the inlet port 118 and outlet port 120) without the need for a bypass cap (204, FIG. 2). For example, when the filter body 102 is screwed to the filter mount 104d (e.g., via the threaded attachment stud 106), the puck O-ring seal 712 may seal off the bypass collar 714. However, if the filter body 102 is removed from the filter mount 104d (e.g., for flushing the plumbing system), the puck valve 702 may be pushed up into the seal block 706 by the spring 708, allowing free water flow through the filter mount chamber 302 from the inlet port 118 to the outlet port 120 via holes or slots 714a set into the base of the bypass collar 714. In some embodiments, the puck valve 702 may include an additional O-ring seal 718 on the inner bore to prevent shaft leakage.

Figure 8:
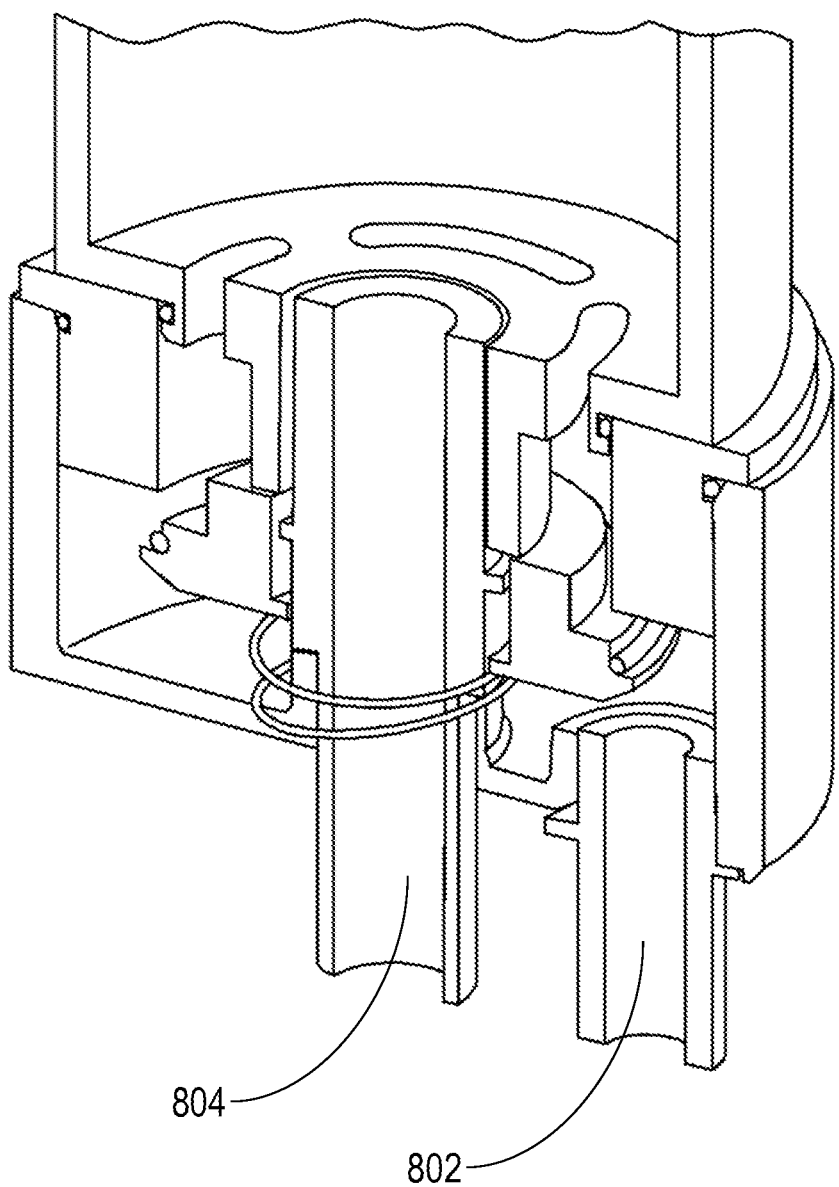
FIG. 8 is an isometric cutaway views illustrating an offset water inlet and offset water outlet of the water filtration device of FIG. 7A.

Referring to FIG. 8, the filter mount 104e may be implemented and may function similarly to the filter mounts 104, 104d of FIGS. 7A and 7B, except that the filter mount 104e may replace the legacy inlet port (118, FIG. 1/7A) and legacy outlet port (120, FIG. 1/7A) with an offset inlet port 802 and an offset outlet port 804 (e.g., eliminating the need for a transfer passage (126, FIG. 1)).

Figure 9B:
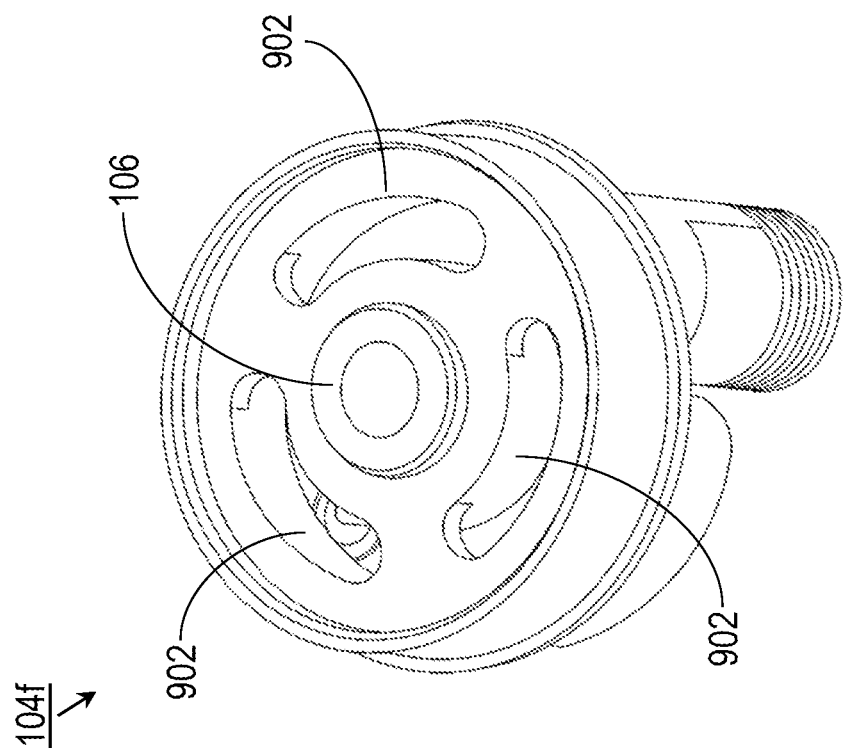
FIGS. 9A and 9B are isometric cutaway views illustrating a peripheral-fill filter base of the water filtration devices of FIGS. 1 and 7A.
Figure 9A:
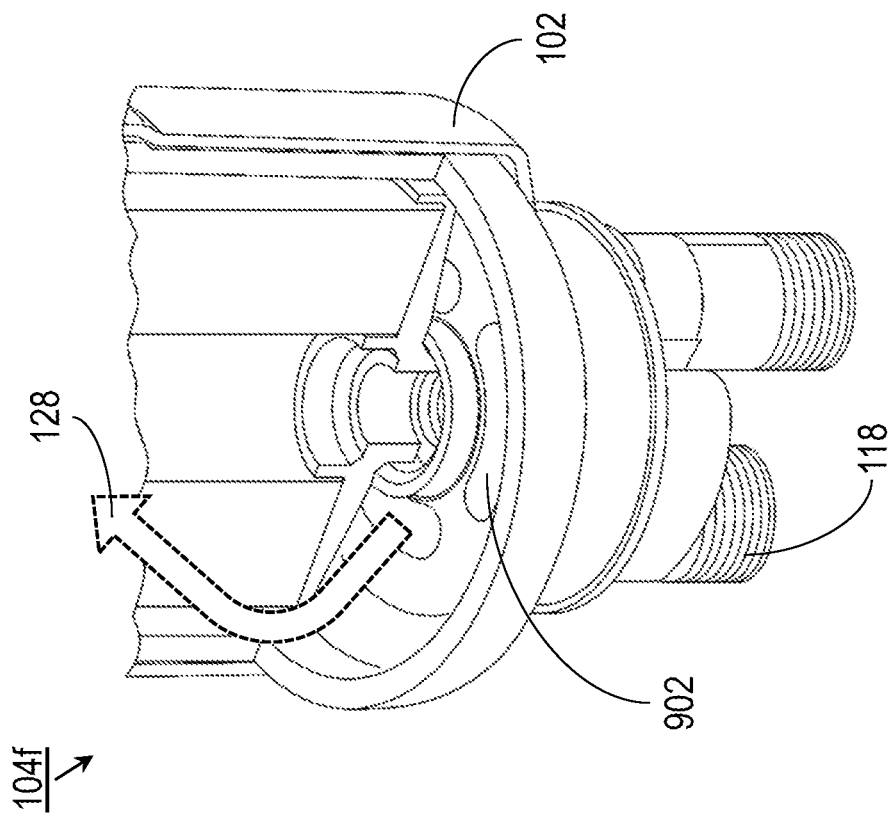

Referring to FIGS. 9A and 9B, the filter mount 104f may be implemented and may function similarly to the filter mounts 104, 104d of FIGS. 7A and 7B, except that the filter mount 104f may enhance uniform water flow from the inlet port 118 to the inlet flow channel 128 via a series of peripheral-fill bypass slots 902 set into the base of the filter body (102, FIG. 7) around the threaded attachment stud 106.

Figure 10:
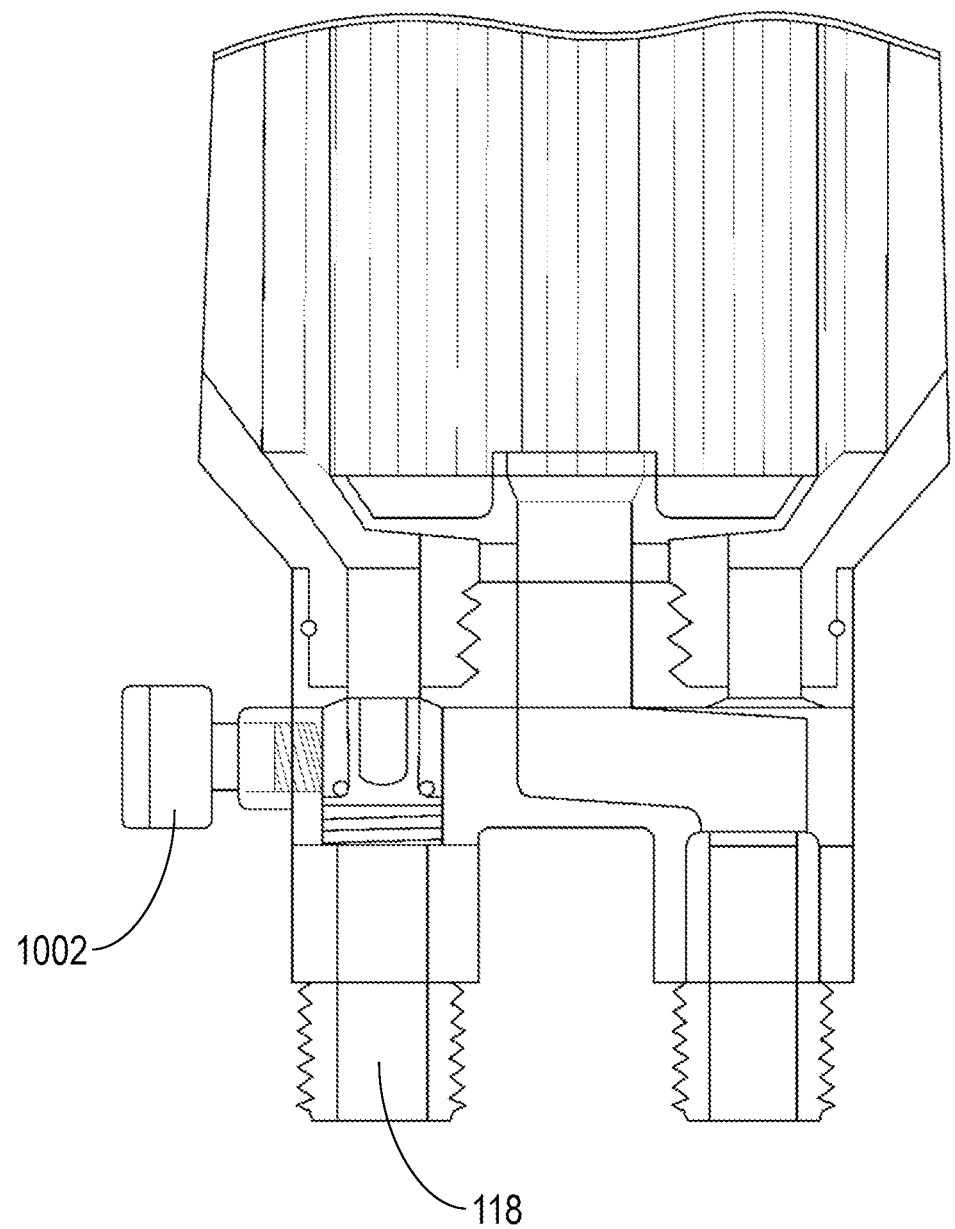
FIG. 10 is a partial cross-sectional view illustrating a pressure sensing system of the water filtration devices of FIGS. 1 and 7A.

Referring to FIG. 10, the filter mount 104g may be implemented and may function similarly to the filter mount 104 of FIGS. 1/7A, except that the filter mount 104g may incorporate a pressure sensor 1002 mounted to the inlet port 118.

Conventional water filtration devices require changing or replacement within a set time period, as under normal operating conditions back pressure (resistance to the water flow from the inlet port 118 to the outlet port 120) will gradually increase, adversely affecting the water flow volume throughout the galley plumbing system until full galley service cannot be provided. With respect to the water filtration devices 100, 100a of FIGS. 1 and 7A, the said devices are in continuous operation during flight operations. As a result, over time either or both of the filtering medium (110, FIG. 1) or the inner and outer filter membranes (502, FIG. 5A; 506, FIG. 5B) may become clogged with suspended organic or non-organic matter (including particles of the filtering membrane itself) which may serve as a carrier for bacteria. At a minimum this may result in taste and odor issues; at worst, this may lead to contamination or food poisoning. Furthermore, water quality across the world may vary widely; the frequency or location of flight operations may result in the capacity or safety of the water filtration devices 100, 100a being out of synchronization with their recommended replacement periods. For example, the water filtration devices 100, 100a may become unsanitary far earlier than the recommended replacement period; alternatively, the devices may be replaced while still capable of safe filtration operations.

In some embodiments, the pressure sensor 1002 may be a passive radio frequency identification (RFID) sensor requiring no external power source. For example, a cabin crewmember or maintenance technician may scan the pressure sensor 1002 with an appropriate scanning or reading device, whereby the pressure sensor may use the inductive feedback loop as a power source and generate accurate data corresponding to the current back pressure within the water filtration device 100, 100a. If the determined back pressure is above a predetermined limit, replacement of the water filtration device 100, 100a would be required. A single pressure sensor 1002 per galley may suffice to accurately report back pressure throughout the galley plumbing system as a whole.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A potable water filtration device, comprising:
a filter body attachable to a filter mount, the filter mount comprising:
a threaded attachment stud surrounded by a filter mount chamber and enclosing a central flow channel;
an inlet port couplable to a water inlet;
an outlet port couplable to a water outlet and to the central flow channel, the outlet port configured to prevent backflow from the water outlet into the filter mount chamber;
and
an annular inlet valve extending around the threaded attachment stud and configured for opening by the attachment of the filter body, the opened annular inlet valve configured for providing fluid communication from the water inlet into the filter body;
the filter body threadedly attachable to the filter mount via the threaded attachment stud and comprising:
at least one filter housing enclosing a filter chamber;
a porous filtering medium disposed within the filter chamber, the filtering medium having a hollow core;
an inlet flow channel between the filtering medium and the filter housing, the inlet flow channel in fluid communication with the water inlet;
an outlet flow channel through the hollow core into the central flow channel, the outlet flow channel in fluid communication with the inlet flow channel through the filtering medium;
a self-venting valve assembly opposite the filter mount; and
a filter base opposite the self-venting valve assembly and proximate to the filter mount, the filter base including a series of bypass slots arranged therein around the threaded mounting stud in a spaced apart relationship, the series of bypass slots configured to admit the water flow from the water inlet into the inlet flow channel.

2. The potable water filtration device of claim 1, comprising:
a transfer passage connecting the central flow channel and the outlet port;
and
at least one annular bypass seal surrounding a base of the threaded attachment stud, the annular bypass seal configured to provide a water flow from the water inlet through the bypass slots to the transfer passage by sealing the filter mount chamber from the filter body.

3. The potable water filtration device of claim 1, further comprising:
a seal block configured to define an outer wall of the filter mount chamber;
and
at least one spring configured to hold the annular inlet valve against the seal block when the filter body is unattached to the filter mount.

4. The potable water filtration device of claim 1, wherein the filtering medium includes sintered carbon.

5. The potable water filtration device of claim 1, further comprising:
at least one radio frequency identification (RFID) sensor attached to the inlet port, the RFID sensor configured to generate pressure data associated with a fluid pressure within the filter chamber.

6. The potable water filtration device of claim 1, wherein the at least one filter housing includes an upper filter housing and a lower filter housing connected by a joint.

7. The potable water filtration device of claim 6, wherein the joint includes one of a spin welded joint, an ultrasonic welded joint, a solvent bonded joint, or a mechanically fastened joint.

8. The potable water filtration device of claim 1, wherein the filter mount further comprises:
 two opposing attachment lobes, each attachment lobe disposed between the inlet port and the outlet port and fastenable to a mounting bracket, the mounting bracket mountable to a substantially vertical surface.

9. The potable water filtration device of claim 1, wherein the self-venting valve assembly comprises:
 a pressure-resistant cap capable of securing the self-venting valve assembly to the filter housing; and
 a movable poppet valve configured to alternatively prevent or allow airflow to or from the filter chamber depending on at least one of 1) a water level within the filter chamber and 2) a fluid pressure within the filter chamber.

10. The potable water filtration device of claim 1, further comprising:
 an outer reinforcing sleeve externally and removably attached to the filter housing, the outer reinforcing sleeve including at least one top hole corresponding to the self-venting valve assembly.

11. The potable water filtration device of claim 1, wherein the at least one filter housing includes an extruded double-wall filter case comprising an outer wall and an inner wall separated by at least one cavity.

12. The potable water filtration device of claim 1, further comprising:
 an outer filter membrane surrounding the filtering medium and configured to protect the filtering medium from one or more particles suspended in the inlet flow channel.

13. The potable water filtration device of claim 12, wherein the outer filter membrane includes a pleated particle filter.

14. The potable water filtration device of claim 1, further comprising:
 an inner filter membrane disposed within the hollow core, the inner filter membrane configured to protect the central flow channel from one or more particles detached from the filtering medium.

15. The potable water filtration device of claim 14, wherein the inner filter membrane includes a pleated particle filter.

* * * * *